(12) United States Patent
Mizoguchi et al.

(10) Patent No.: US 9,825,381 B2
(45) Date of Patent: Nov. 21, 2017

(54) MOUNTING AND CONNECTOR STRUCTURE FOR ELECTRONIC APPARATUS

(71) Applicant: DENSO CORPORATION, Kariya, Aichi-pref. (JP)

(72) Inventors: Tomomichi Mizoguchi, Kariya (JP); Atsushi Sakurai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/992,326

(22) Filed: Jan. 11, 2016

(65) Prior Publication Data
US 2016/0204530 A1    Jul. 14, 2016

(30) Foreign Application Priority Data
Jan. 9, 2015   (JP) ................................. 2015-003569

(51) Int. Cl.
| | |
|---|---|
| H01R 12/71 | (2011.01) |
| H01R 13/52 | (2006.01) |
| H01R 12/70 | (2011.01) |
| H02G 3/16 | (2006.01) |

(52) U.S. Cl.
CPC ..... *H01R 12/7005* (2013.01); *H01R 13/5202* (2013.01); *H02G 3/16* (2013.01); *H01R 12/716* (2013.01); *H01R 13/5213* (2013.01)

(58) Field of Classification Search
CPC ............ H01R 12/7005; H01R 13/5202; H01R 12/716; H01R 13/5213
USPC .................. 439/76.1, 76.2, 521; 361/679.07, 361/728–747
See application file for complete search history.

(56) References Cited

U.S. PATENT DOCUMENTS

| | | | | |
|---|---|---|---|---|
| 5,743,617 A | * | 4/1998 | Sato ...................... | F21S 48/212 248/231.91 |
| 7,209,367 B2 | * | 4/2007 | Nakano ................ | H05K 3/3405 361/775 |
| 2008/0074840 A1 | | 3/2008 | Suzuki | |

FOREIGN PATENT DOCUMENTS

| | | |
|---|---|---|
| EP | 1887842 A1 | 2/2008 |
| JP | 2002-016369 A | 1/2002 |
| JP | 2004-153034 A | 5/2004 |
| JP | 2008-041718 A | 2/2008 |
| JP | 2008-078506 A | 4/2008 |

* cited by examiner

*Primary Examiner* — Renee Luebke
*Assistant Examiner* — Paul Baillargeon
(74) *Attorney, Agent, or Firm* — Oliff PLC (57) ABSTRACT

Mounting and connector structure for an electronic apparatus includes a substrate, a mounting connector mounted on a substrate surface of the substrate, and a mating connector is attached/detached to the mounting connector in a direction perpendicular to the substrate surface, and a casing having a first casing member disposed on a connector mounting surface of the substrate and a second casing member disposed on an opposite surface side of the connector mounting surface, and the casing accommodates the substrate and the mounting connector in an accommodation space which is formed by coupling the casing members to one another. The first casing member is in contact with a first surface that is a side where the mating connector is attached/detached in the mounting connector, and the second casing member is in contact with a second surface that is a side facing to the first surface in the mounting connector.

7 Claims, 7 Drawing Sheets

MOUNTING AND CONNECTOR STRUCTURE FOR ELECTRONIC APPARATUS

CROSS-REFERENCE TO RELATED APPLICATION

This application is based on and claims the benefit of priority from earlier Japanese Patent Application No. 2015-3569 filed Jan. 9, 2015, the description of which is incorporated herein by reference.

TECHNICAL FIELD

The present disclosure relates to a mounting and connector structure for an electronic apparatus composed by accommodating a substrate on which electronic components are mounted in a casing.

BACKGROUND

An electronic apparatus of which electronic components and connectors are mounted on a substrate, and accommodating the substrate in a casing is generally known.

In addition, a configuration using a vertical connector to which a mating connector is attached and detached in a direction perpendicular to a surface of the substrate as a connector mounted on the substrate is known (refer to Japanese Patent Application Laid-Open Publication No. 2002-16369, for example).

In the configuration that mounts the vertical connector on the substrate, a force acts in a normal direction of the substrate through the vertical connector when attaching and detaching the mating connector.

Then, it is considered that a flexural deformation of the substrate occurs due to this force.

Accordingly, there is a concern of occurrence of problems such as breakage in soldering portions of the electronic component and connector terminals.

Incidentally, for a mounting method of connectors in an electronic apparatus, there is a method of screw-fixing the connectors to a die-cast-made casing.

However, for a purpose of cost reduction or the like, when using a sheet-metal casing formed by steel sheet press instead of the die-cast-made casing, it is assumed that screw-fixing is not performed in terms of ensuring waterproofness.

In this case, there is a strong concern that components may become damaged due to the attaching and detaching of the connector.

SUMMARY

An embodiment provides a mounting and connector structure for an electronic apparatus that can suppress problems from being caused by attaching and detaching of a connector A mounting and connector structure for an electronic apparatus according to a first aspect includes a substrate on which an electronic component is mounted, a mounting connector mounted on a substrate surface of the substrate, and a casing having a first casing member disposed on a connector mounting surface of the substrate and a second casing member disposed on an opposite surface side of the connector mounting surface.

A mating connector is attached and detached to the mounting connector in a direction perpendicular to the substrate surface, and the casing accommodates the substrate and the mounting connector in an accommodation space which is formed by coupling the casing members to one another.

The first casing member is in contact with a first surface that is a side where the mating connector is attached and detached in the mounting connector, and the second casing member is in contact with a second surface that is a side facing to the first surface in the mounting connector.

According to the above configuration, the first casing member is in contact with the first surface that is a side where the mating connector is attached and detached in the mounting connector.

In addition, the second casing member is in contact with the second surface that is a side facing to the first surface.

Further, the mounting connector is in a state of being sandwiched by the casing members disposed on both sides of the substrate.

Therefore, even when the force in a normal direction of the substrate acts relative to the mounting connector when the mating connector is attached to or removed from the mounting connector, the force can be received by any one of the casing members, the displacement of the mounting connector.

Thereby, the displacement of the mounting connector, and the flexural deformation of the substrate are suppressed from occurring consequently.

As a result, the suppression of the problems caused by attaching and detaching of the connector can be realized.

BRIEF DESCRIPTION OF THE DRAWINGS

In the accompanying drawings:

FIG. 8A and FIG. 8B are intended to show a description of an effect of the mounting and connector structure for the electronic apparatus according to the present embodiment, FIG. 8B shows the mounting and connector structure for the electronic apparatus of the present embodiment;

DETAILED DESCRIPTION OF THE PREFERABLE EMBODIMENT

Hereinafter, an embodiment of the present disclosure will be explained.

In the present embodiment, an electronic apparatus that is practically used as a power converter of a vehicle will be described as an example.

Figure 2:
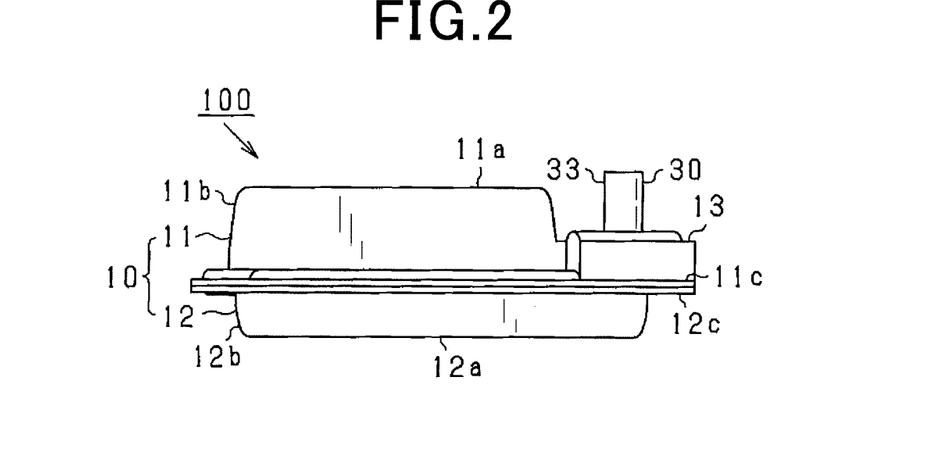
FIG. 2 shows a side view of the electronic apparatus.

In the following description, for convenience of explanation, a vertical direction is defined relative to a state shown in FIG. 2.

As shown in FIGS. 1-4, an electronic apparatus 100 includes a substrate 20, a connector 30 as a mounting connector, and a casing 10 for accommodating the substrate 20 and the connector 30.

Figure 1:
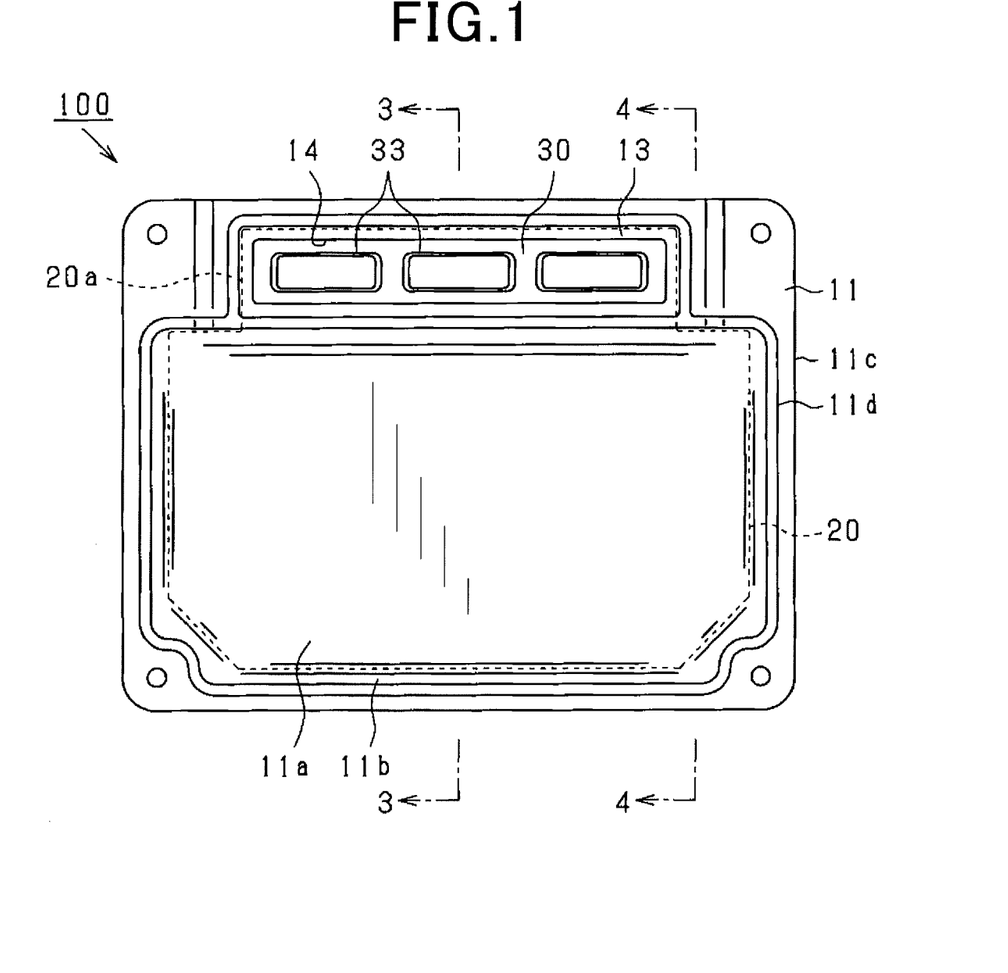
FIG. 1 shows a diagram of an overall configuration of a mounting and connector structure for an electronic apparatus according to the present embodiment.

Note that in FIG. 1, the substrate 20 in the casing 10 is shown in dashed lines.

The casing 10 is a sheet-metal casing formed by press-molding a metal plate such as aluminum or iron, and includes a cover 11 and a case 12 as a first casing member and a second casing member, respectively.

Basically, the cover 11 and the case 12 are coupled to one another by bonding with a sealing part without using screws.

Then, the substrate 20 and the connector 30 are accommodated in an accommodation space formed by the mutual coupling of the cover 11 and the case 12.

Figure 3:
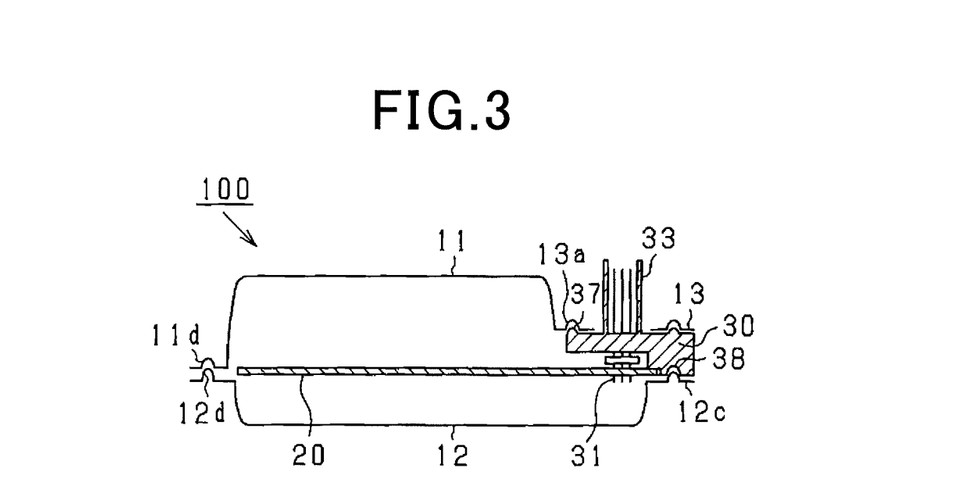
FIG. 3 shows a longitudinal sectional view taken along the line 3-3 of FIG. 1.

The cover 11 has a substantially box shape having a top plate portion 11a and a peripheral wall portion 11b surrounding the top plate portion 11a, and a lower side thereof in the drawing is opened (refer to FIG. 3).

In addition, the case 12 has a substantially box shape having a bottom plate portion 12a and a peripheral wall portion 12b surrounding the bottom plate portion 12a, and an upper side thereof in the drawing is opened (refer to FIG. 3).

Flange portions 11c, 12c are disposed on peripheries of the cover 11 and the case 12, that is, outer sides of the peripheral wall portions 11b, 12b, respectively.

Then, the cover 11 and the case 12 are integrated by the flange portions 11c, 12c being bonded to each other.

Ridges 11d, 12d protruding in the same direction are formed on the flange portions 11c, 12c so as to surround the peripheral wall portions 11b, 12b.

Then, a sealant is filled between the protrusions 11d, 12d.

A joined portion of the cover 11 and the case 12 is sealed by the ridges 11d, 12d and the sealant.

In the present embodiment, the ridges 11d, 12d are formed protruding upwardly, the ridge 11d is formed on the cover 11 as a groove, the ridge 12d is formed on the case 12 as a protrusion, and the cover 11 and the case 12 are assembled by overlapping one another.

Note that a gap where a sealant can be filled is formed between the groove and the protrusion by forming the ridge 12d (protrusion) of the case 12 smaller than the ridge 11d (groove) of the cover 11.

Waterproof performance of the casing 10 is enhanced by joining each part in a state where the sealant is filled between the groove and the protrusion.

It should be noted that, as a sealant, a curing type that cures after a liquid material is disposed can be used instead of a silicon-based moisture-curing adhesive material.

Other waterproof or non-waterproof curable known sealant can also be used.

A stepped portion 13 is formed on the cover 11 at a height position between the top plate portion 11a and the flange portion 11c.

The stepped portion 13 is a portion that forms a connector accommodating space for accommodating the connector 30.

An opening 14 for exposing portions of the connector 30 (fitting portions 33 to be described later) to the outside is formed on an upper surface of the stepped portion 13.

The substrate 20 is a printed circuit board made of an electrically insulating material such as synthetic resin.

Various electronic parts such as a microcomputer, a power transistor, a resistor, a capacitor or the like are mounted on an insulated base material in which wirings including land are formed (not shown) in the substrate 20.

The insulated base material of the substrate 20 is formed by known insulating materials such as a thermoplastic resin, a thermosetting resin, ceramics, or a composite of glass and resin.

The substrate 20 is fixed to the casing 10 by its peripheral edge being sandwiched between the cover 11 and the case 12.

The connector 30 has an elongated shape, and is mounted on one side of the substrate 20 which is a substrate surface.

The connector 30 is configured as a so-called vertical connector to which a mating connector (not shown) is attached and detached in the direction perpendicular to the substrate surface, and is disposed along one side of the substrate 20.

However, an insertion and removal direction of the mating connector is not limited to the direction perpendicular to the substrate surface, but it may be a direction intersecting the substrate surface.

A portion of the substrate 20 where the connector 30 is mounted has the same length as a longitudinal length of the connector 30.

In the present embodiment, as shown in FIG. 1, an outer contour of the substrate 20 has a substantially convex shape and a protrusion 20a of the substrate 20 is a disposition area of the connector 30.

Figure 5:
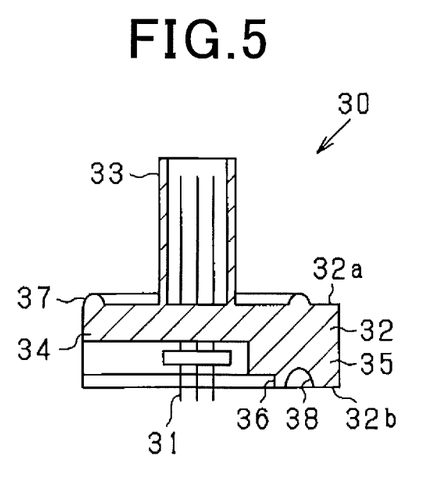
FIG. 5 shows a sectional view of a configuration of a connector.

As shown in FIG. 5, the connector 30 includes a plurality of connector pins 31, and a housing 32 for holding the connector pins 31.

Each of the connector pins 31 has a length that protrudes in a thickness direction from both sides of the housing 32.

Lower ends of the connector pins 31 that protrude from the housing 32 are connected to the substrate 20, while upper ends thereof are connected to the mating connector.

The lower ends of the connector pins 31 are fixed to the substrate 20by soldering or the like.

As shown in FIG. 1, a plurality of fitting portions 33 (three in the present embodiment) each having a substantially rectangular cylindrical shape are disposed on the housing 32 so as to surround a predetermined number of the connector pins 31.

The plurality of fitting portions 33 are arranged side by side in a row in a longitudinal direction of the housing 32.

The fitting portion 33 corresponds to an attaching and detaching portion.

As shown in FIG. 5, a top side in the drawing of the housing 32, that is, a side where the mating connector is attached and detached is formed in a planar shape parallel to the substrate surface and substantially flat, while a bottom side in the drawing of the housing 32 is formed in a stepped shape.

In other words, as viewed in a longitudinal section, the housing 32 has a thin portion 34 and a thick portion 35.

The thin portion 34 is a portion where the connector pins 31 are disposed, and its lower surface is spaced apart from the substrate surface.

In addition, the thick part 35 is disposed outwardly than the thin portion 34 is, and is a protruding portion disposed to protrude outside the substrate 20.

Figure 7:
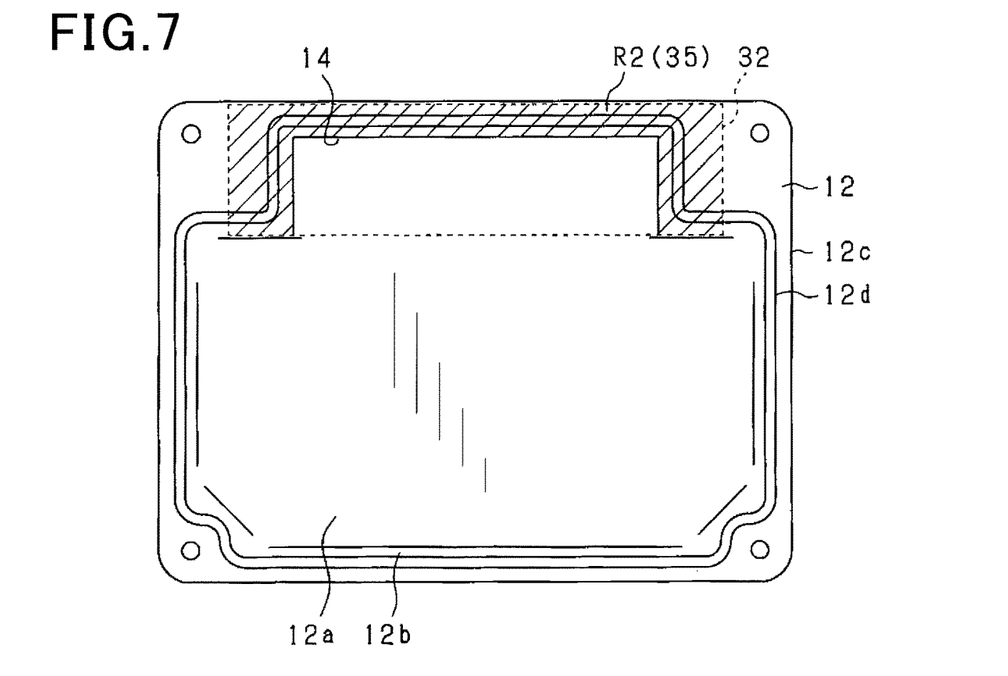
FIG. 7 shows a plan view of a case.

The thick part 35 is disposed in a shape so as to surround the protrusion 20a of the substrate 20 from three sides when viewed in a cross section (refer to FIG. 7).

An end surface of the thick part 35 in a tip end side of the protrusion 20a of the substrate 20 is positioned in a periphery of the casing 10, and is exposed from the casing 10.

In addition, a notch 36 is formed on a lower surface of the thick portion 35 in a substrate side portion.

The notch 36 is a portion that contacts a connector mounting surface of the substrate 20 in a state where the connector 30 is mounted to the substrate 20, and functions as an alignment portion for aligning the connector 30 with respect to the substrate 20.

Then, in a state where the substrate 20 and the connector 30 are accommodated in the casing 10, the stepped portion 13 of the cover 11 contacts an upper surface 32a of the housing 32, and the flange portion 12c of the case 12 contacts a lower surface 32b (the lower surface of the thick portion 35) of the housing 32.

In such a state, the connector 30 is sandwiched between the cover 11 and the case 12.

A holding state of the connector 30 will be further described.

Figure 6:
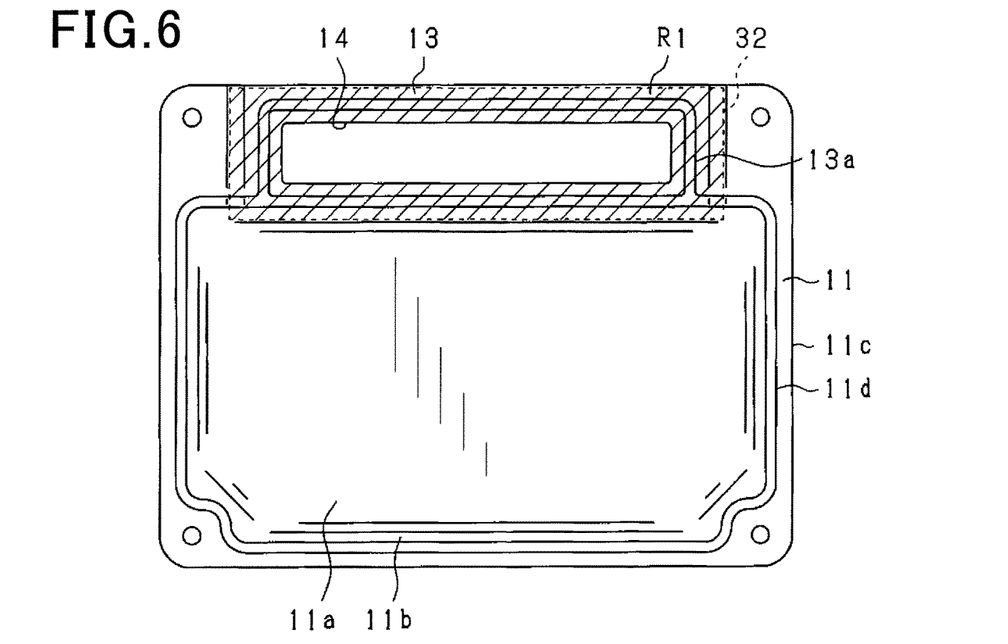
FIG. 6 shows a plan view of a cover.

Contact areas R1, R2 with respect to the housing 32 in the cover 11 and the case 12 are shown in FIGS. 6 and 7.

In each of these drawings, an outline of the housing 32 is shown in dashed lines, and the contact areas R1, R2 are shown by hatching.

As shown in FIG. 6, the contact area R1 that contacts with the upper surface 32a of the housing 32 is disposed on the cover 11 so as to surround the opening 14 of the stepped portion 13 annularly.

That is, the contact area R1 is disposed at a position surrounding the plurality of fitting portions 33 of the connector 30.

Further, as shown in FIG. 7, the contact area R2 is disposed on the case 12 to match a lower surface shape of the thick portion 35 of the housing 32.

In other words, the contact area R2 is formed at a position surrounding the protrusion 20a of the substrate 20 from three directions.

The contact area R2 is disposed in a position vertically overlapping to the contact area R1 as viewed in a longitudinal section.

In the mounting and connector structure for the electronic apparatus 100 configured as described above, when the mating connector is attached and detached in a direction perpendicular to the fitting portion 33 of the connector 30, the force applied to the connector 30 by the insertion and removal is received by the casing 10.

Thereby, a flexural deformation of the substrate 20 is suppressed from occurring.

Figure 8A:
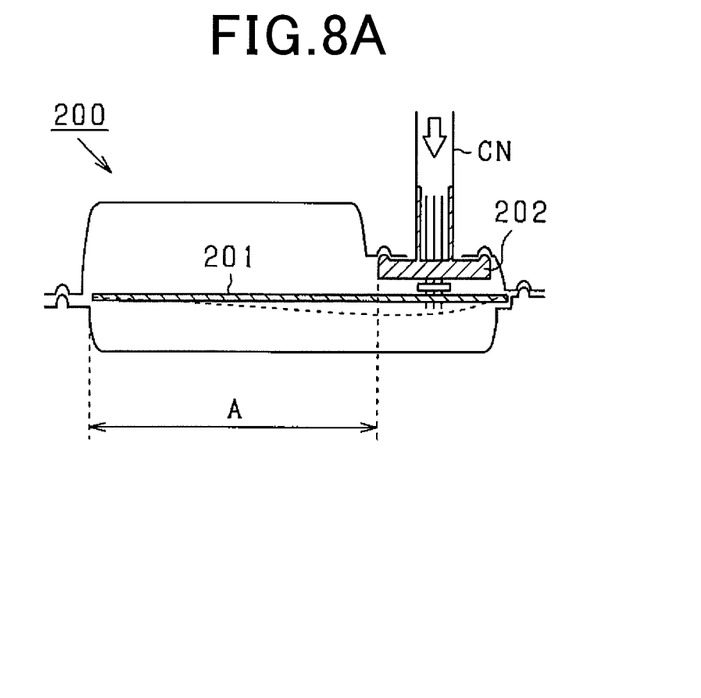
FIG. 8A shows a conventional a mounting and connector structure for an electronic apparatus as a comparison.
Figure 8B:
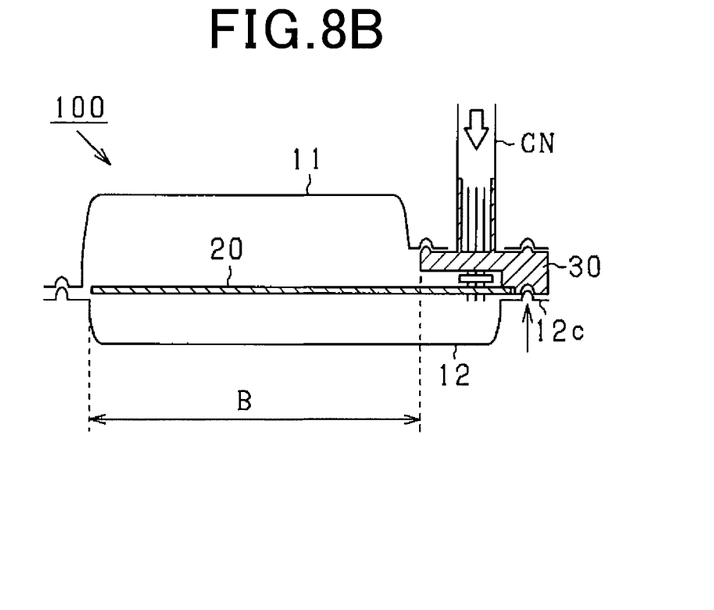

This will be further described according to FIGS. 8A and 8B.

The FIG. 8A shows a conventional electronic apparatus 200 as a comparison, and FIG. 8B shows the electronic apparatus 100 according to the present embodiment.

Note that in the conventional electronic apparatus 200, a vertical type connector 202 is mounted on a substrate 201 in an inner portion than a peripheral portion of a casing.

In the conventional electronic apparatus 200, as shown in FIG. 8A, when a mating connector CN is attached to the connector 202 from a direction perpendicular to the substrate 201, the connector 202 is displaced downwardly by a downward force acting on the connector 202, and consequently the flexural deformation of the substrate 201 occurs.

Accordingly, there is a risk of problems such as breakage in soldering portions of electronic parts or connector pins.

In contrast, in the electronic apparatus 100 of the present embodiment, as shown in FIG. 8B, when a mating connector CN is attached to the connector 30 from a direction perpendicular to the substrate 20, a downward force acting on the connector 30 is received by the flange portion 12c of the case 12, that is, the contact area R2 in the case 12 (refer to FIG. 7).

Thus, displacement of the connector 30, and the flexural deformation of the substrate 20 are suppressed from occurring consequently.

Therefore, the occurrence of problems such as breakage in the soldering portions of the electronic components or the connector pins is suppressed from occurring.

Although a description using the drawings is omitted, it is assumed that the same effect can be obtained even when detaching the mating connector CN from the connector 30.

That is, although an upward force acts on the connector 30 when detaching the mating connector CN from the connector 30, the force is received at the stepped portion 13 of cover 11, i.e., the contact area R1 of the cover 11 (refer to FIG. 6).

Thereby, the displacement of the connector 30, and the flexural deformation of the substrate 20 are suppressed from occurring.

Moreover, since the contact areas R1, R2 are continuously formed along the longitudinal direction of the connector 30, at least two parts of the plurality of fitting portions 33 away from each other in an arrangement direction contact the upper surface 32a of the connector 30 in the cover 11 side.

In addition, at least two parts of the plurality of fitting portions 33 away from each other in the arrangement direction contact the upper surface 32a of the connector 30 in the case 12 side.

Therefore, even when the mating connector is attached and detached with respect to the fitting portion 33 at the most end, and a force deviating to one side of the longitudinal direction is applied to the connector 30, for example, an occurrence of problems such as breakage in soldering portions due to the force is suppressed from occurring.

In addition, when comparing the electronic apparatus 100 of the present embodiment and the conventional electronic apparatus 200, a mounting are where electronic components can be mounted in the substrate is expanded in the electronic apparatus 100 of the present embodiment as compared with the conventional electronic apparatus 200.

That is, while the mounting area in the conventional electronic apparatus 200 is A, since a portion of the connector 30 is disposed so as to protrude from the substrate 20 (protruding portion) in the electronic apparatus 100 of the present embodiment, the mounting area becomes B which is larger than A (refer to FIGS. 8A and 8B).

Further, the sealing part is disposed along the contact area R1 in the cover 11 side contact area R1.

Furthermore, the sealing part is disposed along the contact area R2 in the case 12 side contact area R2.

Specifically, as shown in FIG. 5, a ridge 37 is formed at a position surrounding the fitting portions 33 on the upper surface 32a of the housing 32.

The ridge 37 is formed in the same size as the ridge 12d of the case 12, and in addition to the upper surface 32a of the housing 32, the ridge 37 is continuously formed also on a side of the housing 32.

As shown in FIG. 6, a ridge 13a that is overlapped with respect to the ridge 37 of the housing 32 is formed in the stepped portion 13 of the cover 11.

The ridge 13a of the stepped portion 13 is formed at a position corresponding to the contact area R1, and is continuous to the ridge 11d of the flange 11c.

Therefore, when the connector 30 is in a state being assembled to the stepped portion 13 of the cover 11, the cover 11 side ridge 13a is configured as a groove, the housing 32 side ridge 37 is configured as a protrusion, and the ridge 13a and the ridge 37 are overlapped to each other.

Figure 4:
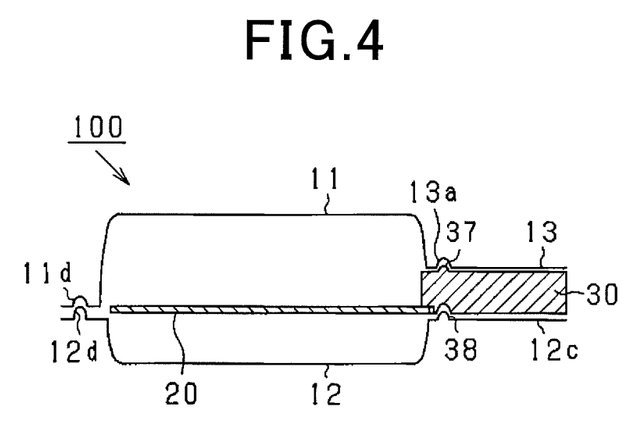
FIG. 4 shows a longitudinal sectional view taken along the line 4-4 of FIG. 1.

Further, since the sealant is interposed therebetween, a sealing part is constituted (refer to FIG. 3 and FIG. 4).

The sealing part is continuous to the sealing part disposed at the joined portion of the cover 11 and the case 12.

In addition, as shown in FIG. 5, a groove 38 is formed along the longitudinal direction of the thick portion 35 in the lower surface 32b of the housing 32.

The groove 38 is formed in the same size as the groove of the ridge 11d of the cover 11.

Further, as shown in FIG. 7, a ridge 12d is formed at the flange portion 12c of the case 12 in a position corresponding to the contact area R2.

Therefore, when the connector 30 is in a state being assembled into the case 12, the case 12 side ridge 12d is overlapped with respect to the housing 32 side groove 38.

Further, since the sealant is interposed therebetween, a sealing part is constituted (refer to FIG. 3 and FIG. 4).

The sealing part is continuous to the sealing part disposed at the joined portion of the cover 11 and the case 12.

It should be noted that the sealing part disposed on the joined portion of the cover 11 and the case 12 corresponds to a first sealing part, and the sealing part disposed on the contact portion between the cover 11 and the housing 32, and the contact portion between the case 12 and the housing 32 correspond to second sealing parts.

Next, assembly of the electronic apparatus 100 having the above configuration will be described.

First, the cover 11 and the case 12 formed by press molding a sheet metal are prepared.

In addition, the connector 30 is mounted on the substrate 20 on which electronic components are mounted.

At this time, the connector pins 31 are inserted into through-holes of the substrate 20, while the connector 30 is fixed in a state where the notch 36 of the housing 32 is in contact with an end of the substrate 20.

In this state, the connector 30 is disposed along one side of the substrate 20, and a portion of the connector 30 (the protruding portion; the thick portion 35 of the housing 32) is in a state of protruding to the outside of the substrate 20.

Then, the assembly of the cover 11 and the case 12 is performed with respect to the substrate 20 and the connector 30.

At this time, the assembly of the cover 11 to the substrate 20 and the connector 30 is performed first, then the assembly of the case 12 is perform.

Specifically, the cover 11 is set in a direction so that the top plate portion 11a faces the bottom and the flange portion 11c faces the top (opposite to that of FIG. 3, etc.), and the sealant is applied on the cover 11 side ridges 11d, 13a.

Then, in this state, the substrate 20 and the connector 30 is assembled to the cover 11 from the above.

At this time, the ridge 37 of the housing 32 is overlapped onto the ridge 13a of the stepped portion 13 of the cover 11, and the sealing part in the contact area R1 is formed.

Subsequently, the assembly of the case 12 is performed.

At this time, first, the sealant is applied in the groove 38 of the housing 32.

Then, the ridge 12d of the case 12 is overlapped on the ridge 11d of the flange portion 11c of the cover 11 and the groove 38 of the housing 32, and a sealing part at the peripheral portion of the substrate 20 including the contact area R2 is formed.

According to the above, it is possible to achieve the following excellent effects.

The first casing member is in contact with a first surface that is a side where the mating connector is attached and detached in the mounting connector.

In addition, the second casing member is in contact with a second surface that is a side facing to the first surface.

Further, the mounting connector is in a state of being sandwiched by the casing members disposed on both sides of the substrate.

Therefore, even when the force in a normal direction of the substrate acts relative to the mounting connector when the mating connector is attached to or removed from the mounting connector, the force can be received by any one of the casing members, thereby the displacement of the mounting connector, and the flexural deformation of the substrate are consequently suppressed from occurring.

As a result, the suppression of the problems caused by attaching and detaching of the connector can be realized.

Since the contact area R1 is disposed at the position to surround the opening 14 of the cover 11, when the mating connector is attached and detached with respect to the fitting portion 33 disposed on an inner side of the opening 14, the force due to the attaching and detaching applied to the substrate 20 can be suppressed.

In a case where the plurality of fitting portions 33 are arranged side by side in a row in the connector 30, when the mating connector is attached and detached with respect to the fitting portion 33 of the most end, for example, a force deviating to one side of the longitudinal direction is applied to the connector 30.

In this regard, it is configured that at least two parts of the plurality of fitting portions 33 away from each other in an arrangement direction contact the upper surface 32a of the connector 30 in the cover 11.

In addition, it is configured that at least two parts of the plurality of fitting portions 33 away from each other in an arrangement direction contact the upper surface 32a of the connector 30 in the case 12.

Therefore, even when the force deviating to one side of the longitudinal direction is applied to the connector 30, an occurrence of problems due to the force is suppressed from occurring.

Since the connector 30 is disposed closer to the one side of the substrate 20 so as the protruding portion of the connector 30 to protrude to the outside of the substrate 20, it becomes easy to secure the mounting area on the substrate 20.

Furthermore, a suitable configuration can be realized in terms of disposing a portion sandwiched between the cover 11 and the case 12 in the connector 30.

It is configured that sealing parts are disposed at a contact portion between the cover 11 and the housing 32 and at a contact portion between the case 12 and the housing 32, and the sealing parts are continuous with the sealing part disposed at the joined portion of the cover 11 and the case 12.

As a result, in the configuration of sandwiching the connector 30 with the cover 11 and the case 12, it is possible to more appropriately seal the casing 10.

Since the sealant is configured to be filled in each sealing part, it is possible to improve the waterproof performance of the casing 10.

The present disclosure can be implemented as follows without being limited to the above.

It should be appreciated that, in the following description, components identical with or similar to those in the above are given the same reference numerals, and repeated structures and features thereof will not be described in order to avoid redundant explanation.

In the above embodiment, the ridges 11d, 12d, 13a and the like are formed protruding upwardly on the cover 11, the case 12, and the housing 32, and thereby constitute the sealing parts.

However, this may be changed to form the ridges 11d, 12d, 13a and the like protruding downwardly on the cover 11, the case 12, and the housing 32

Figure 9:
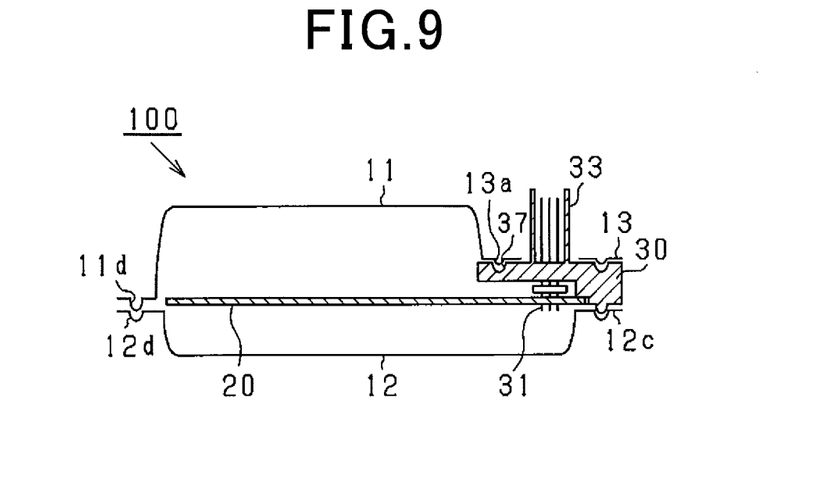
FIG. 9 shows a diagram of a modified example of the mounting and connector structure for the electronic apparatus.

That is, as shown in FIG. 9, protrusions are formed on the cover 11 side and the lower surface side of the housing 32, and grooves are formed on the case 12 side and the upper surface side of the housing 32, and the cover 11 and the case 12 are assembled by overlapping one another.

In this case, a groove opening is upward in the state of FIG. 9.

Therefore, when assembling the electronic apparatus 100, attachment of the cover 11 is possible while viewing the grooves on the upper surface of the connector 30.

Therefore, it is possible to improve the assembling property.

In the above embodiment, each of the contact areas R1, R2 is disposed in a planar shape having a predetermined width.

However, this may be changed that it may be disposed in a linear shape, or may be disposed in a distributed manner.

In other words, the cover 11, the case 12 and the housing 32 are sufficient to contact each other in the overlapping direction, and its structure is optional.

In addition, although the contact areas R1, R2, are configured to extend in a direction perpendicular to the direction of the connector pin 31, this may be changed to configure extending in a predetermined angular direction with respect to the direction of the connector pin 31, for example.

In the above embodiment, the contact area R1 of the cover 11 side is disposed so as to surround the entire periphery of the opening 14 of the connector 30.

However, the contact area R1 may be disposed so as to surround at least a part of the periphery of the opening 14 of the connector 30.

Figure 10:
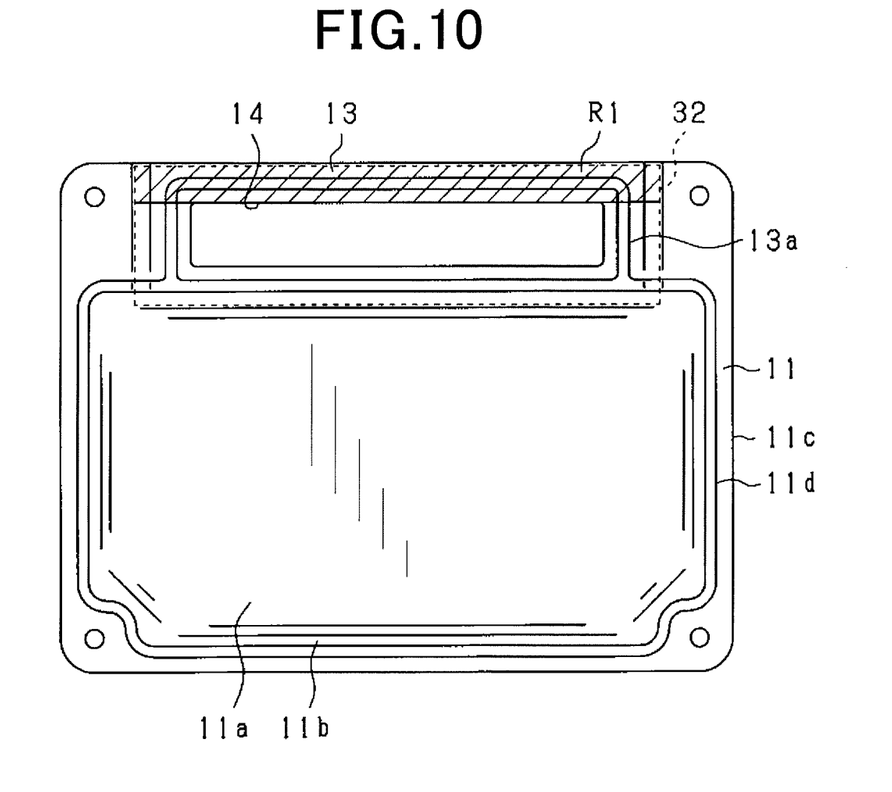
FIG. 10 shows a diagram of another modified example of the mounting and connector structure for the electronic apparatus.

For example, as shown in FIG. 10, the contact area R1 may be disposed only at a position along the longitudinal direction of the connector 30.

At this time, the respective contact area R1 may be disposed on both sides sandwiching the connector 30, or may be disposed only on a lower side in the drawing of the connector 30 in contrast to FIG. 10

Similarly, the contact area R2 of the case 12 side may be disposed only at a position along the longitudinal direction of the connector 30.

Figure 11:
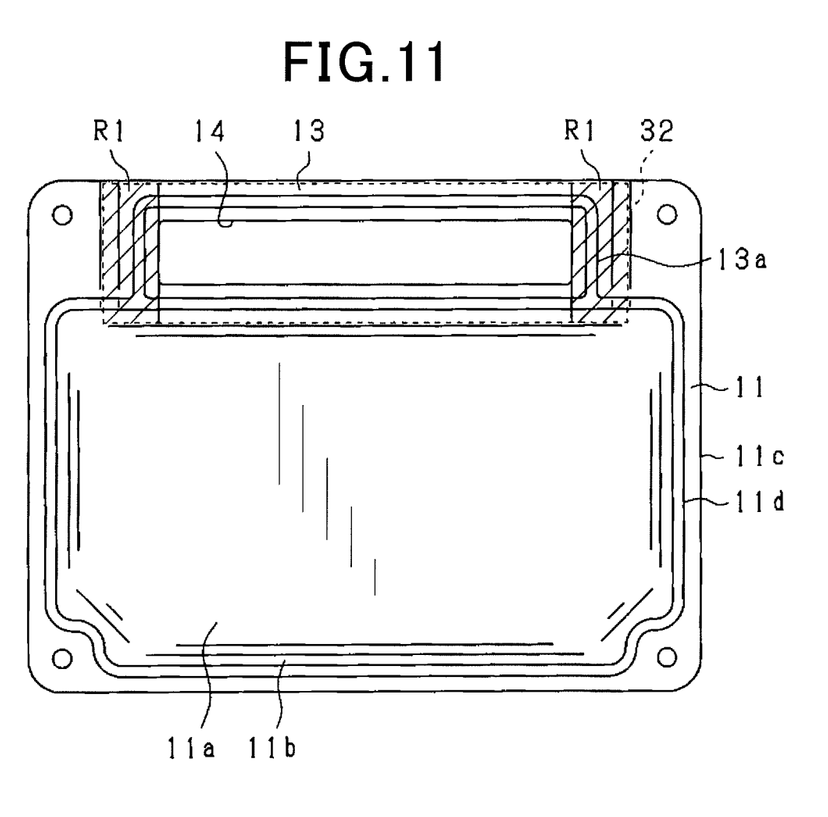
FIG. 11 shows a diagram of another modified example of the mounting and connector structure for the electronic apparatus.

Alternately, as shown in FIG. 11, the contact area R1 of the cover 11 side may be disposed at positions in a longitudinal ends of the connector 30.

The same applies to the contact area R2 of the case 12 side.

In any case, the structure is sufficient that at least two parts of the fitting portions 33 away from each other in the arrangement direction contact the upper surface 32a of the connector 30 in the cover 11, and at least two parts of the fitting portions 33 away from each other in the arrangement direction contact the lower surface 32b of the connector 30 in the case 12.

In this case, in a plurality of positions corresponding to two or more, or all among the plurality of fitting portions 33, it may be configured that the cover 11 and the connector 30 are in contact, while the case 12 and the connector 30 are in contact.

The contacting area R1 may be disposed at positions surrounding the opening 14, and at positions in two different directions relative to the opening.

For example, the contact area R1 may be disposed at a position along the longitudinal direction of the connector 30, and at a position along the lateral direction of the connector 30, respectively.

In this case, even when the mating connector is attached and detached with respect to the fitting portions 33 disposed on the inner side of the opening 14, and a force due to the attaching and detaching is applied to the substrate 20 deviating the substrate 20 to one direction, an occurrence of problems due to the force is suppressed from occurring.

The sealing part is preferably formed so as to surround annularly an outer peripheral shape of the substrate 20.

In this case, it is possible to secure waterproof performance in the substrate 20 regardless of the shape of the contact areas R1, R2.

In the above, the casing 10 is ensured to be a waterproof structure by applying a sealant to the sealing part.

Other than this, a sealant may not be applied to the sealing part.

In this case, it is possible to simplify the configuration of the electronic apparatus.

Instead of forming the cover 11 and the case 12 of the casing 10 by press molding the sheet metal, it is possible to form by a die-cast molding or the like.

In the above, it is configured that the contact areas R1, R2 are disposed at the position overlapping in a vertical direction when viewed in a longitudinal section of the electronic apparatus 100.

However, other than this, it may be configured to dispose the contact areas R1, R2 at a position that does not overlap in the vertical direction when viewed in the longitudinal section of the electronic apparatus 100.

What is claimed is:

1. A mounting and connector structure for an electronic apparatus comprising:
   a substrate on which an electronic component is mounted;
   a mounting connector mounted on a substrate surface of the substrate, and a mating connector is attached and detached to the mounting connector in a direction perpendicular to the substrate surface; and
   a casing having a first casing member disposed on a connector mounting surface side of the substrate and a second casing member disposed on an opposite surface side of the connector mounting surface, and the casing accommodates the substrate and the mounting connector in an accommodation space which is formed by coupling the casing members to one another, wherein:
   the first casing member is in contact with a first surface that is a side where the mating connector is attached and detached in the mounting connector,
   the second casing member is in contact with a second surface that is a side facing to the first surface in the mounting connector,
   each of the first casing member and the second casing member comprise at least one flange portion disposed on a respective periphery, and
   the mounting connector is sandwiched between the at least one flange portion of the first casing member and the at least one flange portion of the second casing member.

2. The mounting and connector structure for the electronic apparatus according to claim 1, wherein,
the mounting connector includes an attaching and detaching portion to which the mating connector is attached and detached;
the first casing member has an opening for inserting the attaching and detaching portion; and
the first surface of the mounting connector is in contact at a position surrounding the opening in the first casing member.

3. The mounting and connector structure for the electronic apparatus according to claim 1, wherein,
the mounting connector includes a plurality of attaching and detaching portions to which the mating connector is attached and detached, and the plurality of attaching and detaching portions are arranged in a row,
at least two parts of the plurality of attaching and detaching portions away from each other in an arrangement direction in the first casing member contact the first surface of the mounting connector; and
at least two parts of the plurality of attaching and detaching portions away from each other in an arrangement direction in the second casing member contact the second surface of the mounting connector.

4. The mounting and connector structure for the electronic apparatus according to claim 2, wherein,
the mounting connector includes a plurality of attaching and detaching portions to which the mating connector is attached and detached, and the plurality of attaching and detaching portions are arranged in a row,
at least two parts of the plurality of attaching and detaching portions away from each other in an arrangement direction in the first casing member contact the first surface of the mounting connector; and
at least two parts of the plurality of attaching and detaching portions away from each other in an arrangement direction in the second casing member contact the second surface of the mounting connector.

5. The mounting and connector structure for the electronic apparatus according to claim 1, wherein,
the mounting connector has a protruding portion protruding to an outside of the substrate; and
the first surface and the second surface are formed on the protruding portion.

6. The mounting and connector structure for the electronic apparatus according to claim 1, wherein,
a first sealing part composed of a groove and a protrusion is formed in a joined portion of each casing member coupled to each other; and
a second sealing part that is continuous to the first sealing part is formed on a contact portion between the first casing member and the mounting connector, and on a contact portion between the second casing member and the mounting connector.

7. The mounting and connector structure for the electronic apparatus according to claim 6, wherein,
there is provided a sealant that is filled between the groove and the protrusion of each of the sealing part.

* * * * *